Oct. 25, 1938.   S. G. WISE   2,134,167
WATERLESS GAS HOLDER
Filed Aug. 25, 1936
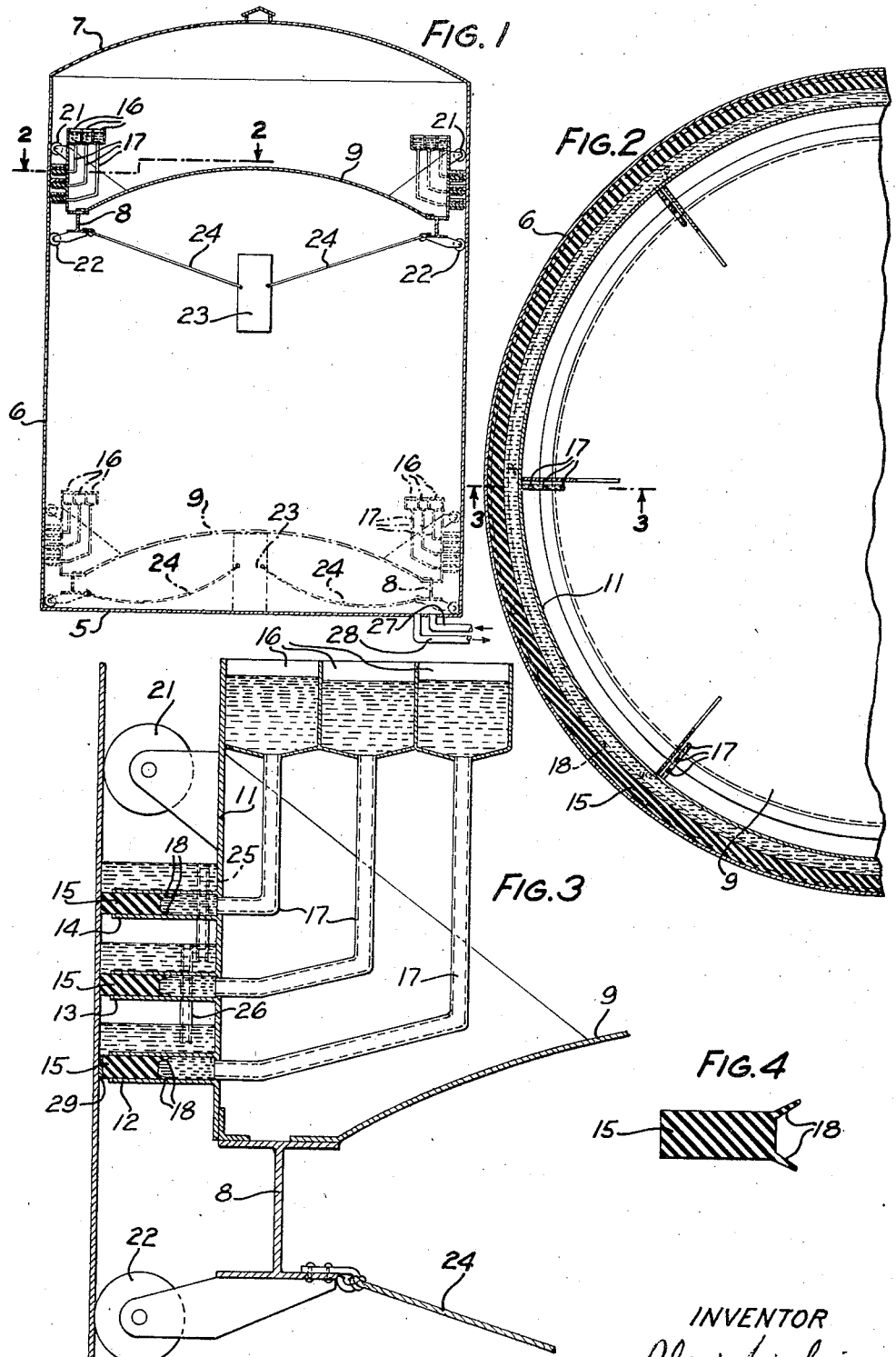
INVENTOR Patented Oct. 25, 1938

2,134,167

UNITED STATES PATENT OFFICE 2,134,167

WATERLESS GASHOLDER

Samuel Griffin Wise, Scarsdale, N. Y.

Application August 25, 1936, Serial No. 97,757

6 Claims. (Cl. 48—176)

My invention relates to a gas reservoir, and more particularly to a waterless seal type of reservoir.

An object of the invention is to provide a new and improved gas reservoir.

Another object is to provide an effective and efficient seal for a gas reservoir.

A further object is to provide a movable closure for a gas reservoir having its center of buoyancy above its center of gravity.

Other objects and advantages will be apparent from the following description taken in conjunction with the accompanying drawing, in which Fig. 1 is a vertical section of a gas reservoir embodying the invention;

Fig. 2 is a horizontal section taken on line 2—2 of Fig. 1;

Fig. 3 is an enlarged sectional view of the seal taken on line 3—3 of Fig. 2, and Fig. 4 is a cross-section of the sealing member before being inserted into the expansion chamber described below.

Referring now in detail to the drawing, the gas reservoir comprises a shell or housing consisting essentially of a base 5, a wall 6 of circular or polygonal cross section, and a top wall or roof 7. Within the housing is an annular I beam or ring 8 which is of smaller diameter than the shell and forms a support for a closure disk 9 which is preferably convex so as to raise the center of buoyancy when the closure member is suspended in the shell by the pressure of the gas underneath.

The annular I beam also serves to support the gas seal which closes the space between the annular beam and the wall 6. This seal comprises a cylindrical wall 11 having radially extending disks secured to its outer periphery to form expansion chambers 12, 13 and 14. Each of the expansion chambers has an endless expansion ring 15 therein made of elastic or flexible material such as rubber, rubber composition, or other suitable material. The expansion rings are forced outwardly against the wall 6 by means of a hydrostatic fluid supplied to the expansion chambers from fluid reservoirs 16 connected to the expansion chambers by conduits 17. The expansion rings 15 may be provided with continuous flanges or tongues 18 which are forced against the walls of the expansion chambers by the pressure of the hydrostatic fluid and prevent the escape of the fluid. Any suitable liquid may be used as the hydrostatic fluid but preferably a fluid is used having a low variation of viscosity with temperature changes and which does not deleteriously affect the material of the expansion rings. As an example of a suitable fluid, a mixture of alcohol and castor oil in substantially equal proportions may be mentioned.

The expansion rings 15 and the wall 6 are lubricated by providing a small quantity of lubricant in the annular space formed above each expansion chamber by the walls 11 and 6. For the purpose of maintaining the lubricant at the desired level a tube or series of tubes 25 extends through the expansion chamber 14 and a second tube or series of tubes 26 extends through the expansion chamber 13, the tubes being sealed against the escape of gas by extending into the liquid in the space below. By this means a quantity of lubricant may be maintained above each of the expansion rings 15.

In order to properly space the movable closure member, upper and lower guide rollers 21 and 22 are provided, however, the lower set of rollers 21 may be omitted by correctly locating the centers of buoyancy and gravity. As stated above, the closure member 9 is made convex or higher at its center than at its periphery in order to raise the center of buoyancy. In addition to this, a ballast weight 23 is suspended beneath the movable closure member by cables 24 secured to the annular ring 8. The ballast also acts as a support for center of closure member when in its lowest position. This construction eliminates any tendency for the closure member to tilt and holds the member in a level position.

In operation, gas is supplied to the reservoir through a conduit 27 to raise the closure member from its lower position shown in dotted lines in Fig. 1, to a higher position, depending upon the amount of gas forced into the reservoir. An outlet conduit 28 is provided through which gas may be withdrawn from the reservoir.

In order for any gas to escape around the periphery of the movable closure member, it must pass in succession each of the three expansion rings. The lubricant for the expansion rings serves also to indicate the location of a leak since the escaping gas will bubble through the lubricant and cause a visible disturbance at the point of escape. In some cases it may be desirable to provide a metallic strip on the outer face of the lower expansion ring in order to scrape the side wall 6 and keep it free from ice or other foreign matter.

While the invention has been described in connection with a specific embodiment thereof, it will be understood that many changes and modifications may be made therein without departing from the spirit and scope of the invention.

I claim:

1. A waterless gasholder having a movable closure member, a fluid seal therefor, said closure member being concave on its lower surface and having its center of buoyancy in the center of the holder, and a lumped ballast suspended centrally under said closure member to lower the center of gravity to a point below the center of buoyancy, said ballast being suspended in a vertical axis passing through the center of buoyancy of said closure member.

2. A waterless gasholder having a movable closure member, a fluid seal therefor, said closure member being higher in the center than at its periphery to raise the center of buoyancy, and a lumped ballast centrally suspended under said member to lower the center of gravity, the center of buoyancy of said closure and the center of gravity of said ballast being in the same vertical axis.

3. A waterless gasholder having a movable closure member, a fluid seal therefor, said closure member being higher in the center than at its periphery to raise the center of buoyancy, a ballast suspended under said closure member so as to lower the center of gravity and flexible means for suspending said ballast.

4. A waterless gasholder having a movable closure member, a seal therefor comprising an annular expansion member having parallel upper and lower faces, an expansion chamber having parallel walls in which said expansion member is freely movable, and means for applying a uniform fluid pressure directly to the inner peripheral area of said expansion member.

5. A waterless gasholder having a movable closure member, a seal therefor comprising an annular expansion member having parallel upper and lower faces, an expansion chamber having parallel walls in which said expansion member is freely movable, said expansion member having rearwardly extending tongues engaging the parallel walls of said chamber, and means for applying a uniform fluid pressure directly to the inner peripheral area of said expansion member.

6. A waterless gasholder having a movable closure member, a seal therefor comprising an annular expansion member, an expansion chamber forming a guide for said annular member in which said annular member is freely and slidably movable in a radial direction, and means for applying a direct, uniform fluid pressure to the inner peripheral area of said expansion member.

S. GRIFFIN WISE.